US009735987B2

(12) United States Patent
Farkas et al.

(10) Patent No.: US 9,735,987 B2
(45) Date of Patent: Aug. 15, 2017

(54) METHODS, SYSTEMS, AND COMPUTER PROGRAM PRODUCTS FOR DETERMINING A DEMODULATION REFERENCE SEQUENCE FOR AN INTERCELL INTERFERING SIGNAL RECEIVED FROM A MOBILE DEVICE IN A LONG TERM EVOLUTION COMMUNICATION SYSTEM

(71) Applicant: Collision Communications, Inc., Peterborough, NH (US)

(72) Inventors: Joseph Farkas, Merrimack, NH (US); Sayak Bose, Nashua, NH (US); Brandon Hombs, Merrimack, NH (US)

(73) Assignee: COLLISION COMMUNICATIONS, INC., Portsmouth, NH (US)

( * ) Notice: Subject to any disclaimer, the term of this patent is extended or adjusted under 35 U.S.C. 154(b) by 107 days.

(21) Appl. No.: 14/261,772

(22) Filed: Apr. 25, 2014

(65) Prior Publication Data
US 2015/0312917 A1 Oct. 29, 2015

(51) Int. Cl.
 *H04L 25/02* (2006.01)
 *H04W 72/08* (2009.01)
 *H04L 5/00* (2006.01)
 *H04J 11/00* (2006.01)

(52) U.S. Cl.
 CPC ........ *H04L 25/0228* (2013.01); *H04J 11/005* (2013.01); *H04L 5/00* (2013.01); *H04L 25/0226* (2013.01)

(58) Field of Classification Search
 None
 See application file for complete search history.

(56) References Cited

U.S. PATENT DOCUMENTS

| 2007/0177697 | A1  | 8/2007  | Calderbank et al. |
| 2009/0238149 | A1  | 9/2009  | Kawabata |
| 2011/0280287 | A1* | 11/2011 | Cheng ............ H04L 1/0019 375/219 |
| 2013/0039285 | A1* | 2/2013  | Sorrentino ........ H04L 5/0091 370/329 |
| 2014/0128078 | A1* | 5/2014  | Zhu ............. H04W 52/0206 455/437 |
| 2014/0247799 | A1* | 9/2014  | Suzuki ............ H04J 13/0062 370/329 |
| 2015/0139004 | A1* | 5/2015  | Fodor ............. H04W 72/082 370/252 |

OTHER PUBLICATIONS

LTE; Evolved Universal Terrestrial Radio Access (E-UTRA); Physical Channels and Modulation (3GPP TS 36.211 version 10.0.0 Release 10), ETSI Technical Specification, ETSI TS 136 211 v. 10.0.0 (Jan. 2011), 105 pages.

* cited by examiner

Primary Examiner — Chi H Pham
Assistant Examiner — Soon-Dong D Hyun

(57) ABSTRACT

Methods and systems are described for determining a Demodulation Reference Sequence (DMRS) for an intercell interfering signal received from a mobile device in a Long Term Evolution (LTE) communication system. In one aspect, an interfering signal transmitted from a mobile device being served by a second cell of an LTE communication system is received at a receiver serving a first cell in the LTE communication system. At least one transmit parameter is detected from the received interfering signal. A DMRS for the received interfering signal is determined based on the detected transmit parameter.

46 Claims, 4 Drawing Sheets

METHODS, SYSTEMS, AND COMPUTER PROGRAM PRODUCTS FOR DETERMINING A DEMODULATION REFERENCE SEQUENCE FOR AN INTERCELL INTERFERING SIGNAL RECEIVED FROM A MOBILE DEVICE IN A LONG TERM EVOLUTION COMMUNICATION SYSTEM

RELATED APPLICATIONS

This application is related to U.S. patent application Ser. No. 14/261,784, now U.S. Pat. No. 9,231,749, titled "Methods, Systems, And Computer Program Products For Determining A Radio Network Temporary Identifier And Coding Rate For An Intercell Signal In A Long Term Evolution Communications Network," filed on even date herewith, the entire disclosure of which is here incorporated by reference.

BACKGROUND

Intercell interference is a common problem in cellular communication systems. For example, in a Long Term Evolution (LTE) network, mobile devices in other cells cause intercell interference by transmitting on the LTE uplink at the same time and frequency. Intercell interference is partially mitigated by spatially combining multiple receive antennas. Since direct knowledge of the interfering signals is not known, these spatial techniques rely on techniques that do not model the interference directly. Modeling the interference directly can yield a significant improvement in suppressing intercell interference.

One method of suppressing intercell interference is to explicitly have knowledge of the transmit parameters of the intercell users and thereby have knowledge of a reference signal in the interfering transmission. With this knowledge, multi-user parameter estimation and multi-user detection algorithms can jointly model the intracell and intercell users, providing significant improvement in intercell interference rejection.

Conventional methods for directly modelling intercell signals requires the explicit sharing of all information so that the transmit parameters for an interfering signal are known ahead of time. However, explicitly sharing this much information requires a high throughput, low latency link between cells, making it impractical and too expensive to deploy in many cases.

Accordingly, there exists a need for improved methods, systems, and computer program products for determining a reference signal for an intercell interfering signal received from a mobile device.

SUMMARY

Methods and systems are described for determining a Demodulation Reference Sequence (DMRS) for an intercell interfering signal received from a mobile device in an LTE communication system. In one aspect, an interfering signal transmitted from a mobile device being served by a second cell of an LTE communication system is received at a receiver serving a first cell in the LTE communication system. At least one transmit parameter is detected from the received interfering signal. A DMRS for the received interfering signal is determined based on the detected transmit parameter.

BRIEF DESCRIPTION OF THE DRAWINGS

Advantages of the claimed invention will become apparent to those skilled in the art upon reading this description in conjunction with the accompanying drawings, in which like reference numerals have been used to designate like or analogous elements, and in which:

DETAILED DESCRIPTION

Figure 1:
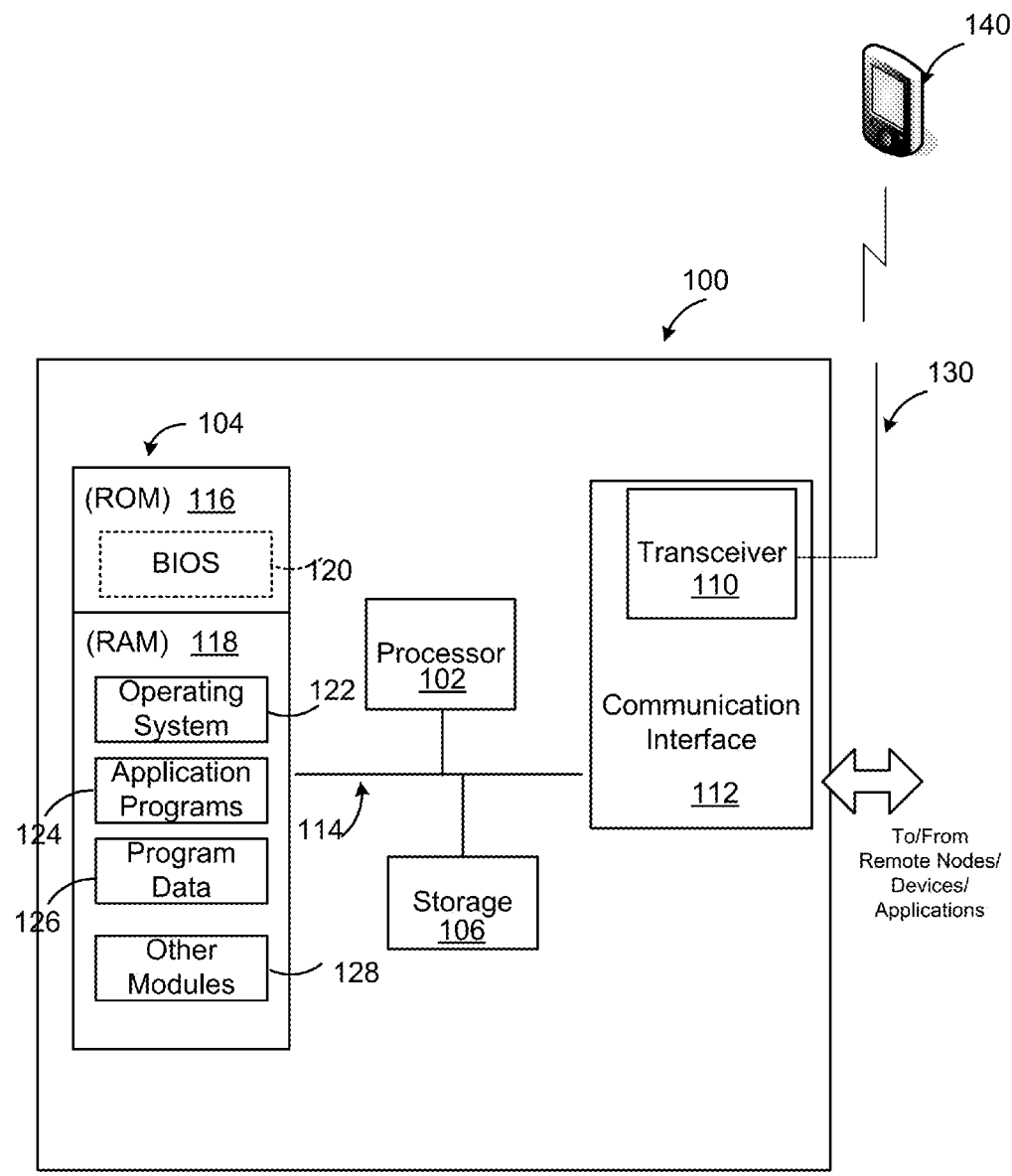
FIG. 1 is a block diagram illustrating an exemplary hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, transceiver 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100. It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128.

The hardware device 100 may be part of a base station (not shown) configured to communicate with mobile devices 140 in a communication network. A base station may also be referred to as an eNodeB, an access point, and the like. A base station typically provides communication coverage for a particular geographic area. A base station and/or base station subsystem may cover a particular geographic coverage area referred to by the term "cell." A network controller (not shown) may be communicatively connected to base stations and provide coordination and control for the base stations. Multiple base stations may communicate with one another, e.g., directly or indirectly via a wireless backhaul or wireline backhaul.

The hardware device 100 may operate in a networked environment using logical connections to one or more remote nodes via communication interface 112, including communicating with one or more mobile devices 140 via a transceiver 110 connected to an antenna 130. The mobile devices 140 can be dispersed throughout the network 100. A mobile device may be referred to as user equipment (UE), a terminal, a mobile station, a subscriber unit, or the like. A mobile device may be a cellular phone, a personal digital assistant (PDA), a wireless modem, a wireless communication device, a handheld device, a laptop computer, a wireless local loop (WLL) station, a tablet computer, or the like. A mobile device may communicate with a base station directly, or indirectly via other network equipment such as, but not limited to, a pico eNodeB, a femto eNodeB, a relay, or the like.

The remote node may be a computer, a server, a router, a peer device or other common network node, and typically includes many or all of the elements described above relative to the hardware device 100. The communication interface 112, including transceiver 110 (or separate transmitter and receiver) may interface with a wireless network and/or a wired network. For example, wireless communications networks can include, but are not limited to, Code Division Multiple Access (CDMA), Time Division Multiple Access (TDMA), Frequency Division Multiple Access (FDMA), Orthogonal Frequency Division Multiple Access (OFDMA), and Single-Carrier Frequency Division Multiple Access (SC-FDMA). A CDMA network may implement a radio technology such as Universal Terrestrial Radio Access (UTRA), Telecommunications Industry Association's (TIA's) CDMA2000, and the like. The UTRA technology includes Wideband CDMA (WCDMA), and other variants of CDMA. The CDMA2000® technology includes the IS-2000, IS-95, and IS-856 standards from The Electronics Industry Alliance (EIA), and TIA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advance (LTE-A) are newer releases of the UMTS that use E-UTRA. UTRA, E-UTRA, UMTS, LTE, LTE-A, and GAM are described in documents from an organization called the "3rd Generation Partnership Project" (3GPP). CDMA2000® and UMB are described in documents from an organization called the "3rd Generation Partnership Project 2" (3GPP2). The techniques described herein are primarily focused on LTE and LTE-A networks, but analogously may be used for any of the wireless networks and radio access technologies mentioned above, as well as other wireless networks and radio access technologies.

Other examples of wireless networks include, for example, a BLUETOOTH network, a wireless personal area network, and a wireless 802.11 local area network (LAN). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

LTE currently supports two types of uplink reference signals, the Demodulation Reference Sequence (DMRS), which is associated with transmission of Physical Uplink Shared Channel (PUSCH) or Physical Uplink Control Channel (PUCCH), and the Sounding Reference Signal (SRS), which is not associated with transmission of PUSCH or PUCCH. The DMRS is time multiplexed with uplink data and is used to enable coherent signal demodulation in order to get parameter estimates for the associated data. In order to perform parameter estimation and/or some forms of multi-user detection (MUD) on intercell signals, the DMRS should be known. To determine the DMRS, a base sequence and a cyclic shift is needed. This can be accomplished by detecting transmit parameters necessary to reconstruct the signal, which can include a Base Sequence, Cell ID, Group Number, Bandwidth Allocation, cyclic shift ($\alpha$), Cyclic Shift ($n_{DMRS}^{(1)}$), Dynamic Cyclic Shift ($n_{DMRS}^{(2)}$), and Subframe Number, as defined in the 3GPP standard 36.211. Unfortunately there is some confusion in the naming of parameters in the 3GPP standard between cyclic shift ($\alpha$) and Cyclic Shift ($n_{DMRS}^{(1)}$). Herein, the transmit parameter ($\alpha$) is referred to as cyclic shift ($\alpha$) and ($n_{DMRS}^{(1)}$) is referred to as Cyclic Shift ($n_{DMRS}^{(1)}$). Details on determining these values mathematically can be found in the 3GPP standard and are incorporated herein by reference.

The Base Sequence is a sequence that is a function of the Bandwidth Allocation and the Group Number, and represents the final sequence prior to the phase shift from the cyclic shift ($\alpha$).

The cyclic shift ($\alpha$) is a function of Cell ID, Cyclic Shift ($n_{DMRS}^{(1)}$), Dynamic Cyclic Shift ($n_{DMRS}^{(2)}$), and Subframe Number and is the phase shift applied to the base sequence in the frequency domain, resulting in a time shift in the time domain.

The Cell ID is an ID between 0 and 503 representing a cell that the mobile device is connected to. For the base sequence, the Cell ID is translated to a group number by taking the modulo 30 of the Cell ID. The group number is directly used as an input parameter to construct the base sequence. For the cyclic shift ($\alpha$) calculation, the full Cell ID is necessary.

Bandwidth Allocation represents the number of resource blocks and the location of those resources blocks in frequency space. The number of resource blocks can be used to recreate the DMRS. The location of those resources blocks can be used to identify the signal from the received samples.

The Subframe Number is the LTE subframe number where the transmission occurs. 0

The Cyclic Shift ($n_{DMRS}^{(1)}$) and Dynamic Cyclic Shift ($n_{DMRS}^{(2)}$) are parameters provided by the base station that are used to calculate the final cyclic shift ($\alpha$). The Dynamic Cyclic Shift ($n_{DMRS}^{(2)}$) is similar to Cyclic Shift ($n_{DMRS}^{(1)}$), but is updated more frequently.

Figure 4:
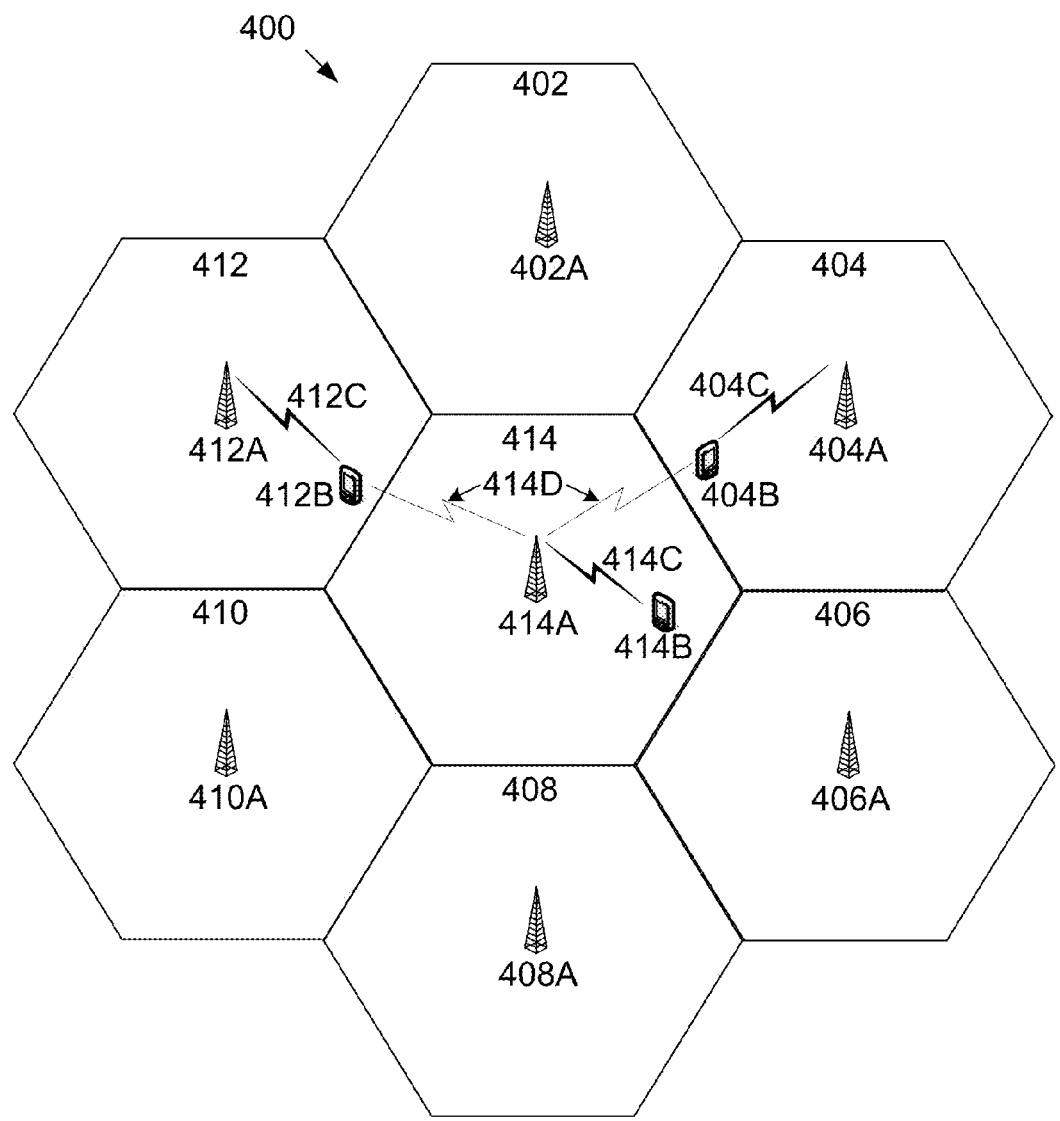
FIG. 4 is a diagram illustrating communications in an LTE system.

FIG. 4 illustrates a typical scenario of a deployed cellular network, such as an LTE cellular network or an LTE-A cellular network. In FIG. 4, cells 402-414 comprise a portion 400 of the cellular network. Each cell 402-414 includes a respective base station 402A-414A. Mobile devices 404B, 412B, and 414B are in communication (or attempting communication) respectively with base stations 404A, 412A, and 414A via communication links 404C, 412C, and 414C. As can be appreciated from the diagram, cells 404 and 412 both border cell 414. Mobile devices 404B and 412B, due to their proximity to base station 414A, are seen as intercell interference 4140 at base station 414A. Accordingly, it is advantageous for a receiver at base station 414A to be able to detect transmit parameters in the interfering signals 4140 such that a DMRS can be determined for each of the interfering signals 4140. Once a DMRS is known, parameter estimates for the mobile devices 404B and 412B can be determined such that any number of options for intercell signal interference mitigation are available, such as interference cancellation or multiuser detection.

Figure 2:
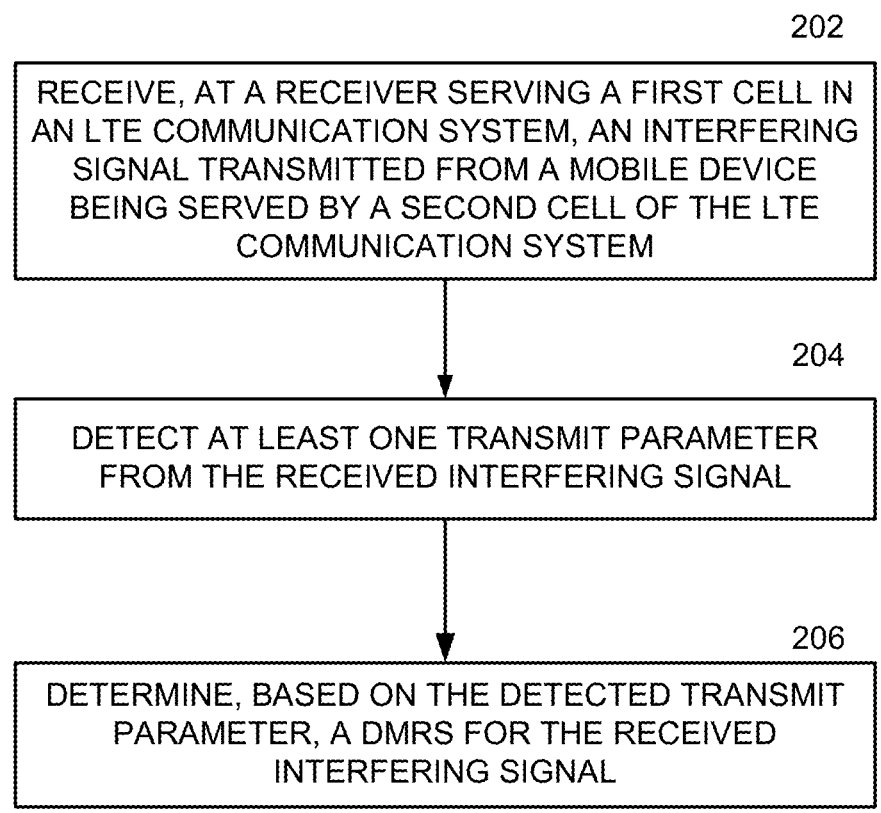
FIG. 2 is a flow diagram illustrating a method for determining a DMRS for an intercell interfering signal received from a mobile device in a LTE communication system according to an aspect of the subject matter described herein.
Figure 3:
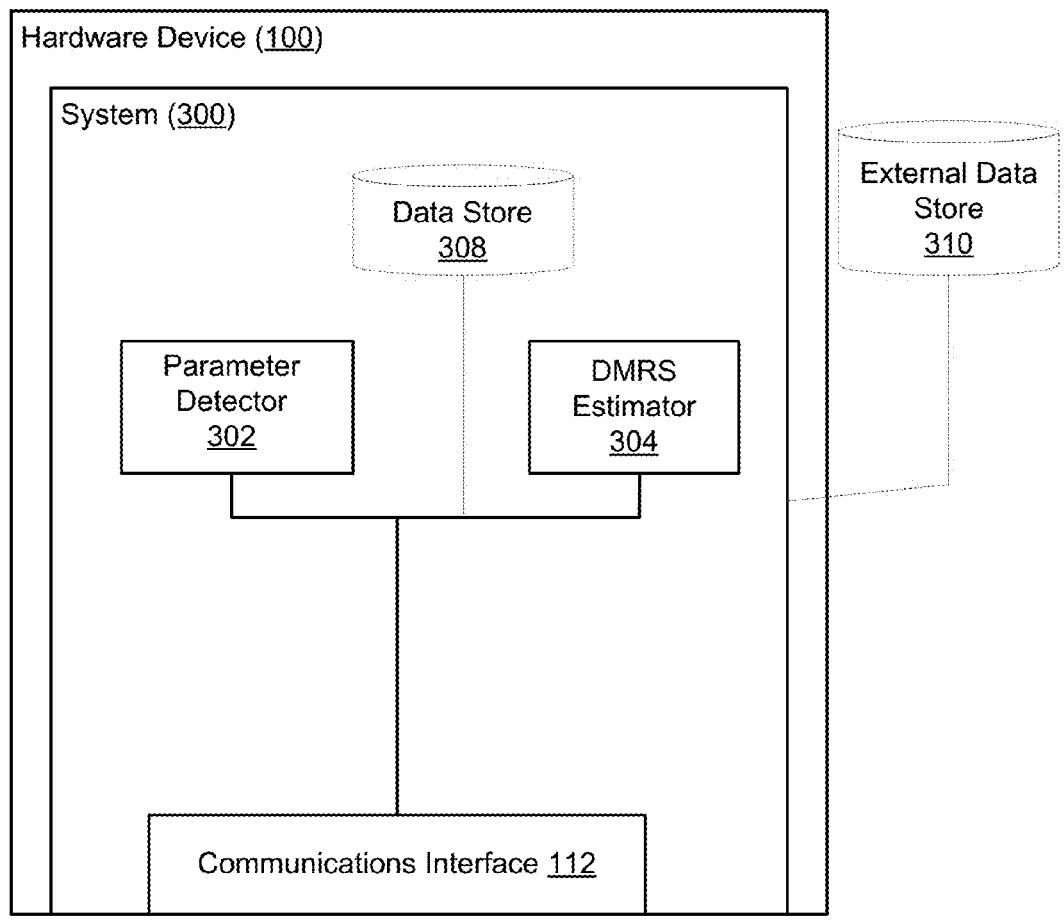
FIG. 3 is a block diagram illustrating an arrangement of components for determining a DMRS for an intercell interfering signal received from a mobile device in a LTE communication system according to another aspect of the subject matter described herein.

Turning now to FIG. 2, a flow diagram is shown illustrating a method for determining a DMRS for an intercell interfering signal received from a mobile device in an LTE communication system according to an exemplary aspect of the subject matter described herein. FIG. 3 is a block diagram illustrating a system 300 with an arrangement of components for determining a DMRS for an intercell interfering signal received from a mobile device in an LTE communication system according to another exemplary aspect of the subject matter described herein. The method in FIG. 2 can be carried out by, for example, some or all of the components illustrated in the exemplary arrangement in FIG. 3 operating in a compatible execution environment, such as the environment provided by some or all of the components of the arrangement in FIG. 1.

With reference to FIG. 2, in block 202 an interfering signal transmitted from a mobile device being served by a second cell of an LTE communication system is received at a receiver serving a first cell in the LTE communication system. Accordingly, a system for determining a DMRS for an intercell interfering signal received from a mobile device in an LTE communication system includes means for receiving, at a receiver serving a first cell in an LTE communication system, an interfering signal transmitted from a mobile device being served by a second cell of the LTE communication system. For example, as illustrated in FIG. 3, a communications interface component 112 is configured to receive, at a receiver serving a first cell in an LTE communication system, an interfering signal transmitted from a mobile device being served by a second cell of the LTE communication system. The communications interface component 112 can be configured to communicate over a corresponding network, such as any of the networks described above, including LTE and LTE-A.

Returning to FIG. 2, in block 204 at least one transmit parameter is detected from the received interfering signal. Accordingly, a system for determining a DMRS for an intercell interfering signal received from a mobile device in an LTE communication system includes means for detecting at least one transmit parameter from the received interfering signal. For example, as illustrated in FIG. 3, a parameter detector component 302 is configured to detect at least one transmit parameter from the received interfering signal.

In one aspect, detecting at least one transmit parameter from the received interfering signal includes detecting at least one of a Base Sequence, a Cell ID, a Group ID, a Bandwidth Allocation, a Subframe Number, a cyclic shift ($\alpha$), a Cyclic Shift ($n_{DMRS}^{(1)}$), and a Dynamic Cyclic Shift ($n_{DMRS}^{(2)}$). For example, the parameter detector component 302 can be configured to detect at least one of these transmit parameters from the received interfering signal.

In another aspect, detecting at least one transmit parameter from the received interfering signal includes performing a subspace projection, which projects the interference into another subspace that minimizes the other signals present. This allows for the detection of the signal itself and helps in the identification of transmit parameters. Specifically, Bandwidth Allocation is much easier to detect without the presence of the other signals. More sophisticated techniques exist but simple power spectral density with thresholding can identify the band a signal is transmitting in if it is isolated from the other signals. One subspace projection technique that may be utilized is MUSIC, which is a signal classification technique that can isolate the interferer with subspace projection. Another subspace projection technique that may be utilized is spatial and/or time processing in which other exploitable dimensions, such as space and time, can be done in isolation or combined for space-time processing. Other useful methods of subspace projection are independent component analysis and principal component analysis. These techniques can also exploit the fact that the DMRS is a constant envelope signals. The subspace projection methods may utilize the reference or data symbols of the interference. Another method for distinguishing the Bandwidth Allocation is by exploiting the frequency continuity of the channel, since across carriers the channel estimate of a DMRS should be somewhat smooth.

In another aspect, detecting at least one transmit parameter from the received interfering signal includes baud rate detection. Baud rate detection during the data transmissions around the DMRS can lead directly to signal detection and Bandwidth Allocation identification.

In another aspect, detecting at least one transmit parameter from the received interfering signal includes detecting through compressed sensing. Compressed sensing can be utilized when we know there are only a small number of active signals compared to the total number of possible signals. For example, we can hypothesize that only 10 DMRS waveforms are active and let the compressed sensing algorithm find the subset of 10 that best match the data with this sparseness constraint.

In another aspect, detecting at least one transmit parameter from the received interfering signal includes detecting at least one of a Base Sequence and a cyclic shift ($\alpha$) based on prior channel estimates, which can be obtained through at least one of a SRS or previous successful DMRS detections. The SRS is based on fewer transmit parameters and it is therefore a simpler detection problem feasible to determine the SRS of an adjacent cell and use the SRS to obtain channel estimates. For example, the parameter detector component 302 can be configured to detect one Base Sequence and Bandwidth Allocation through using a previous channel estimate by incorporating the knowledge of the channel in the calculation to determine the transmitted signal.

Returning to FIG. 2, in block 206 a DMRS for the received interfering signal is determined based on the detected transmit parameter. Accordingly, a system for determining a DMRS for an intercell interfering signal received from a mobile device in a LTE communication system includes means for determining, based on the detected transmit parameter, a DMRS for the received interfering signal. For example, as illustrated in FIG. 3, a DMRS estimator component 304 is configured to determine, based on the detected transmit parameter, a DMRS for the received interfering signal.

In one aspect, determining a DMRS for the received interfering signal includes determining at least one other transmit parameter based on the detected transmit parameter and determining the DMRS based on the detected transmit parameter and the determined other transmit parameter. For example, the DMRS estimator component 304 can be configured in this manner to determine a DMRS for the received interfering signal.

The generation of the DMRS is defined in the 3GPP standard 36.211, but the formula can be simplified as, DMRS=$r(n)*e^{j\alpha n}$, 0≤n<M, where r is the Base Sequence, $\alpha$ is the cyclic shift ($\alpha$), M is the length of the reference signal sequence, and the DMRS is defined in the frequency domain. The Base Sequence is a function of the length of the Bandwidth Allocation and Cell ID. The cyclic shift ($\alpha$) is a function of the Cell ID, Cyclic Shift ($n_{DMRS}^{(1)}$), and Dynamic Cyclic Shift ($n_{DMRS}^{(2)}$).

Once a potential DMRS is generated, it can be checked against the received signal by comparing it to the received interfering signal since it will be known where exactly the DMRS occurs in the received packet. This operation can be performed in the time or frequency domain. A check is typically a multiplication or correlation of the received signal's DMRS with the potential DMRS. If the result is above some threshold, then the potential DMRS is considered the received signal's DMRS. Other forms of verifications can be used.

Many approaches can be employed to successfully recover the DMRS of the interfering signals and various factors affect which is the best approach. The approaches generally fall into two categories, detecting transmit parameters and searches through known copies. These techniques are effective in isolation but solutions may also include a combination or iteration of these two approaches. As an example, suppose Bandwidth Allocation can be detected and a Subframe Number is known, it may then be possible to do an exhaustive or semi-exhaustive search for the other parameters by generating a copy of the output DMRS and comparing that to the received signal.

For illustration and contrast purposes, if an approach of exhaustively searching all combinations of the lower level parameters necessary to generate the DMRS (i.e., Cell ID, Bandwidth Allocation, cyclic shift ($\alpha$), Cyclic Shift ($n_{DMRS}^{(1)}$), Dynamic Cyclic Shift ($n_{DMRS}^{(2)}$) and Subframe Number) were used, there would be an enormous number of possible combinations of DMRS's to create and attempt to check against the received signal, making this approach impractical in a real time system.

In another aspect, determining a DMRS for the received interfering signal includes determining a set of potential DMRSs based on the detected at least one transmit parameter and determining the DMRS by comparing at least one of the potential DMRSs to the received interfering signal. For example, the DMRS estimator component 304 can be configured to determine a DMRS for the received interfering signal by determining a set of potential DMRSs based on the detected at least one transmit parameter and determine the DMRS by comparing at least one of the potential DMRSs to the received interfering signal. With reference to FIG. 3, information regarding potential DMRSs can be stored and searchable in a local data store 308 and/or an external data store 310. These components are, however, optional in the system 300, as indicated by the dashed lines.

Instead of performing an exhaustive search, in accordance with the subject matter described herein, the transmit parameters are first identified individually or in small groups and then a small set of potential DMRS are checked against the received signal to determine which ones were used. The key to identifying parameters individually or in small groups is to realize that many of these parameters can be found through individual or group detection. Bandwidth Allocation can often be determined after a subspace projection. Next we may narrow the search space using any or all of the techniques described hereinafter. A technique that is effective when there is a large search space and few interfering signals is compressed sensing. Compressed sensing is effective when there are many searches but few interfering signals since it can return the top candidates of a large search very efficiently.

In another aspect, determining a DMRS for the received interfering signal includes determining one or more likely Cell IDs based on a relationship between the first cell and other cells of the LTE communication system. For example, the DMRS estimator component 304 can be configured to determine a DMRS for the received interfering signal by determining one or more likely Cell IDs based on a relationship between the first cell and other cells of the LTE communication system. Since Cells IDs are static, it is possible to know which Cell IDs have mobile devices that are likely to cause interference. Referring again to FIG. 4, cells 402-412 are adjacent to cell 414 and are likely to have interfering mobile devices, such as mobile devices 404B and 412B. Accordingly, the search for Cell IDs can be limited to the neighboring cells as they are likely to cause significant interference. Note that antenna patterns, obstructions, and other factors may influence which cells contain interfering mobile devices.

In another aspect, determining a DMRS for the received interfering signal includes determining one or more likely Subframe Numbers based on a relationship between the first cell and other cells of the LTE communication system. For example, the DMRS estimator component 304 can be configured to determine a DMRS for the received interfering signal by determining one or more likely Subframe Numbers based on a relationship between the first cell and other cells of the LTE communication system. Many LTE networks are synchronized in time and therefore a desired cell's Subframe Number can be the same as for surrounding cells. In an unsynchronized environment, only periodic Subframe Numbers must be estimated and an offset between your Subframe Number and the Subframe Number of the interference can assumed to be static for short periods of time.

In another aspect, determining a DMRS for the received interfering signal includes determining, for a given transmit parameter, a subset of all possible values permitted for an LTE communication system, the subset being determined based on a rule employed by the network operator. For example, the DMRS estimator component 304 can be configured to determine a DMRS for the received interfering signal by determining, for a given transmit parameter, a subset of all possible values permitted for an LTE communication system, the subset being determined based on a rule employed by the network operator. In example, the rule employed by the network operator can include at least one of a restriction on a number of allowable Base Sequences, a restriction on a time progression of Base Sequences, a restriction on a number of total allowable cyclic shifts ($\alpha$), and a restriction on a number of allowable Bandwidth Allocations. For example, a network operator could stipulate that a user can only increase/decrease their Bandwidth Allocation by 1 resource block per subframe.

Since the allocation of bandwidth, the setting of Cell IDs, and the selection of Cyclic Shift ($n_{DMRS}^{(1)}$) and Dynamic Cyclic Shift ($n_{DMRS}^{(2)}$) are all determined by the base station or through network planning, these values can be restricted from the complete set allowed by LTE (or LTE-A). These can either be static rules for the network or can be adapted slowly through information shared between the base stations.

Accordingly, in another aspect, determining a DMRS for the received interfering signal includes determining the transmit parameter based on information shared between base stations. For example, the DMRS estimator component 304 can be configured to determine a DMRS for the received interfering signal by determining the transmit parameter based on information shared between base stations. Information can be shared between base stations. The information can be shared over a wired or wireless link that can be separate from the receiver that communicates with the mobile devices. As discussed above, the general presumption is the link between base stations over which the information is shared lacks the capacity to simply share all of the information regarding transmit parameters, but includes capacity for a limited amount of information to be shared. For example, determining a DMRS for the received interfering signal can include determining the DMRS based on information shared between base stations regarding a Base Sequence and a cyclic shift ($\alpha$). For example, the DMRS estimator component 304 can be configured to determine the DMRS based on information shared between base stations regarding a Base Sequence and a cyclic shift ($\alpha$). In another aspect, the information shared is at least one of a number of users requesting scheduling grants, earlier allocations of a base sequence, earlier allocations of a cyclic shift ($\alpha$), a Cell ID, and partial scheduling information. This information can be used for the detection of one or more transmit parameters. The earlier allocations of either base sequence or cyclic shift can be used to predict future allocation and/or tie those the previous allocations to specific users. Partial scheduling information including one or more transmit parameters is shared on a real-time or near real-time basis.

In another aspect, determining the DMRS based on the at least one transmit parameter includes determining a Base Sequence based on at least one of a Cell ID, a Bandwidth Allocation, and a Subframe Number. For example, the DMRS estimator component 304 can be configured to determine the DMRS based on the at least one transmit parameter by determining a Base Sequence based on at least one of a Cell ID, a Bandwidth Allocation, and a Subframe Number.

In another aspect, determining the DMRS based on the at least one transmit parameter includes determining a cyclic shift ($\alpha$) by correlating a time domain version of the Base Sequence using a known cyclic shift ($\alpha$) with the received signal, determining a time offset from the known cyclic shift ($\alpha$), and determining the cyclic shift ($\alpha$) based on the determined time offset. The correlation can also be implemented in the frequency domain using a multiplication to product similar results. For example, the DMRS estimator component 304 can be configured to determine the DMRS by following this procedure. More particularly, a search for the Base Sequence can be performed in the local data store 308 and/or external data store 310 with a known Bandwidth Allocation and a small list of possible Cell IDs. Once the Base Sequence is identified, the cyclic shift ($\alpha$) is determined by identifying the phase shift or time offset, depending on whether the signal is being processed in, respectively, the frequency or time domain. When the interfering signal arrives with a time offset relative to desired intracell signals, determining a time offset from the cyclic shift ($\alpha$) versus a time offset from the time of arrival due to propagation delay becomes more challenging but can still be distinguished because the cyclic shift translates to a few known time offsets and/or by exploiting the cyclic prefix.

In another aspect, determining a DMRS for the received interfering signal includes determining a cyclic prefix and determining the at least one transmit parameter based on the cyclic prefix. For example, the DMRS estimator component 304 can be configured to determine a DMRS for the received interfering signal by determining a cyclic prefix and determining the at least one transmit parameter based on the cyclic prefix. The cyclic prefix is a part of every LTE and LTE-A signal and is simply a copy of the end of each symbol appended to the beginning of each symbol. Since by definition these are the same phase, this property can be exploited as a reference for the correct cyclic shift ($\alpha$) and/or to identify a time offset caused by propagation delay independent of the cyclic shift ($\alpha$).

In another aspect, determining a DMRS for the received interfering signal includes determining a structure of a correlation between a reference sequence and the received interfering signal, wherein the determined structure is at least one of a width of a correlation peak time, a width of a correlation peak frequency, structure across adjacent resources blocks, and a location of multiple correlation peaks due to the structure of the DMRS signals with different time delays. For example, the DMRS estimator component 304 can configured to determine a DMRS for the received interfering signal by determining a structure of a correlation between a reference sequence and the received interfering signal.

Once the DRMS is determined, a channel estimate for the mobile device transmitting the received interfering signal can be determined based on the determined DMRS. Since the DMRS is a reference sequence, a single user channel estimation may be used but will sometimes be insufficient in a multiuser system. Accordingly, a multiuser channel estimation can be used to jointly obtain channel estimates for the desired and interfering signals.

Once the DRMS is determined, an identity for the mobile device transmitting the received interfering signal can be determined based on the determined DMRS. The identity of a mobile device may be useful so that prior information about a mobile device may be used to aid the determination of a future DMRS. A simple example would be that one or more of the transmit parameters do not change between subsequent transmissions. The identity may not be a specific identifier, but is instead a unique feature of that signal such as the subspace that it is in from one of the subspace projection methods.

In another aspect, the DMRS estimator component 304 can configured to determine a DMRS associated with a desired mobile device (intracell signal) being served by the cell of the receiver and remove the determined DMRS associated with the desired mobile device.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. One of ordinary skill in the art should appreciate after learning the teachings related to the claimed subject matter contained in the foregoing description that variations of those preferred embodiments may become apparent to those of ordinary skill in the art upon reading the foregoing description. The inventor intends that the claimed subject matter may be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method for determining a Demodulation Reference Sequence (DMRS) for an intercell interfering signal received from a mobile device in a Long Term Evolution (LTE) communication system, the method comprising:
   receiving, at a receiver serving a first cell in an LTE communication system, an interfering signal transmitted from a mobile device being served by a second cell of the LTE communication system, the interfering signal received wirelessly as intercell interference; and
   detecting at least one transmit parameter from the wirelessly received interfering signal;
   determining, based on the detected transmit parameter, a DMRS for the received interfering signal without prior explicit knowledge of the DMRS.

2. The method of claim 1 wherein detecting at least one transmit parameter from the received interfering signal includes detecting at least one of a Base Sequence, a Cell ID, Group Number, a Bandwidth Allocation, a Subframe Number, a cyclic shift ($\alpha$), a Cyclic Shift (n(1)DMRS), and a Dynamic Cyclic Shift (n(2)DMRS).

3. The method of claim 1 wherein detecting at least one transmit parameter from the received interfering signal includes determining a Bandwidth Allocation based on data symbols in the received interfering signal.

4. The method of claim 1 wherein detecting at least one transmit parameter from the received interfering signal includes using at least one of principal component analysis, independent component analysis, subspace projection techniques, Multiple Signal Classification (MUSIC), space-time processing, compressed sensing techniques, and baud rate detection.

5. The method of claim 1 wherein detecting at least one transmit parameter from the received interfering signal includes detecting at least one of a Base Sequence and a cyclic shift ($\alpha$) based on prior channel estimates.

6. The method of claim 5 wherein the prior channel estimates are obtained from at least one Sounding Reference Signal (SRS).

7. The method of claim 1 wherein determining a DMRS for the received interfering signal includes:
   determining at least one other transmit parameter based on the detected at least one transmit parameter; and
   determining the DMRS based on the detected at least one transmit parameter and the determined at least one other transmit parameter.

8. The method of claim 1 wherein determining a DMRS for the received interfering signal includes determining a cyclic prefix and determining the at least one transmit parameter based on the cyclic prefix.

9. The method of claim 1 wherein determining the DMRS based on the at least one transmit parameter includes determining a Base Sequence based on at least one of a Cell ID, a Bandwidth Allocation, and a Subframe Number.

10. The method of claim 1 wherein determining a DMRS for the received interfering signal includes determining one or more likely Cell IDs based on a relationship between the first cell and other cells of the LTE communication system.

11. The method of claim 1 wherein determining a DMRS for the received interfering signal includes determining one or more likely Subframe Numbers based on a relationship between the first cell and other cells of the LTE communication system.

12. The method of claim 1 wherein determining a DMRS for the received interfering signal includes determining the transmit parameter based on information shared between base stations.

13. The method of claim 1 wherein determining a DMRS for the received interfering signal includes determining, for a given transmit parameter, a subset of all possible values permitted for an LTE communication system, the subset being determined based on a rule employed by the network operator.

14. The method of claim 13 wherein the rule employed by the network operator includes at least one of a restriction on a number of allowable Base Sequences, a restriction on a time progression of Base Sequences, a restriction on a number of total allowable cyclic shifts ($\alpha$), and a restriction on a number of allowable Bandwidth Allocations.

15. The method of claim 1 wherein determining the DMRS based on the at least one transmit parameter includes determining a cyclic shift ($\alpha$) by:
   correlating a Base Sequence with a known cyclic shift ($\alpha$);
   determining a time offset from the known cyclic shift ($\alpha$); and
   determining the cyclic shift ($\alpha$) based on the determined time offset.

16. The method of claim 1 wherein determining a DMRS for the received interfering signal includes determining a structure of a correlation between a reference sequence and the received interfering signal, wherein the determined structure is at least one of a width of a correlation peak time, a width of a correlation peak frequency, structure across adjacent resources blocks, and a location of multiple correlation peaks.

17. The method of claim 1 wherein determining a DMRS for the received interfering signal includes determining the DMRS based on information shared between base stations regarding a Base Sequence and a cyclic shift ($\alpha$).

18. The method of claim 17 wherein the information shared is at least one of: a number of users requesting scheduling grants, earlier allocations of a base sequence, earlier allocations of a cyclic shift, a cell ID, and partial scheduling information.

19. The method of claim 1 wherein determining a DMRS for the received interfering signal includes:
   determining a set of potential DMRSs based on the detected at least one transmit parameter; and
   determining the DMRS by comparing at least one of the potential DMRSs to the received interfering signal.

20. The method of claim 1 further comprising determining, based on the determined DMRS, a channel estimate for the mobile device transmitting the received interfering signal.

21. The method of claim 1 further comprising determining, based on the determined DMRS, an identity for the mobile device transmitting the received interfering signal.

22. The method of claim 1 further comprising:
   determining a DMRS associated with at least one mobile device being served by the first cell; and
   removing the determined DMRS associated with at least one mobile device being served by the first cell from being considered.

23. A system for determining a DMRS for an intercell interfering signal received from a mobile device in a LTE communication system, the system comprising:
   means for receiving, at a receiver serving a first cell in an LTE communication system, an interfering signal transmitted from a mobile device being served by a second cell of the LTE communication system, the interfering signal received wirelessly as intercell interference;

means for detecting at least one transmit parameter from the wirelessly received interfering signal; and means for determining, based on the detected transmit parameter, a DMRS for the received interfering signal without prior explicit knowledge of the DMRS.

24. A system for determining a DMRS for an intercell interfering signal received from a mobile device in a LTE communication system, the system comprising system components including:

a communications interface component configured to receive, at a receiver serving a first cell in an LTE communication system, an interfering signal transmitted from a mobile device being served by a second cell of the LTE communication system, the interfering signal received wirelessly as intercell interference;

a parameter detector component configured to detect at least one transmit parameter from the wirelessly received interfering signal; and a DMRS estimator component configured to determine, based on the detected transmit parameter, a DMRS for the received interfering signal without prior explicit knowledge of the DMRS.

25. The system of claim 24 wherein the parameter detector component is configured to detect at least one transmit parameter from the received interfering signal by detecting at least one of a Base Sequence, Group Number, a Cell ID, a Bandwidth Allocation, a Subframe Number, a cyclic shift ($\alpha$), a Cyclic Shift (n(1)DMRS), and a Dynamic Cyclic Shift (n(2)DMRS).

26. The system of claim 24 wherein the parameter detector component is configured to detect at least one transmit parameter from the received interfering signal by determining a Bandwidth Allocation based on data symbols in the received interfering signal.

27. The system of claim 24 wherein the parameter detector component is configured to detect at least one transmit parameter from the received interfering signal by using at least one of principal component analysis, independent component analysis, subspace projection techniques, Multiple Signal Classification (MUSIC), space-time processing, compressed sensing techniques, and baud rate detection.

28. The system of claim 24 wherein the parameter detector component is configured to detect at least one transmit parameter from the received interfering signal by detecting at least one of a Base Sequence and a cyclic shift ($\alpha$) based on prior channel estimates.

29. The system of claim 28 wherein the prior channel estimates are obtained from at least one Sounding Reference Signal (SRS).

30. The system of claim 24 wherein the DMRS estimator component is configured to determine a DMRS for the received interfering signal by:

determining at least one other transmit parameter based on the detected at least one transmit parameter; and determining the DMRS based on the detected at least one transmit parameter and the determined at least one other transmit parameter.

31. The system of claim 24 wherein the DMRS estimator component is configured to determine a DMRS for the received interfering signal by determining a cyclic prefix and determining the at least one transmit parameter based on the cyclic prefix.

32. The system of claim 24 wherein the DMRS estimator component is configured to determine the DMRS based on the at least one transmit parameter by determining a Base Sequence based on at least one of a Cell ID, a Bandwidth Allocation, and a Subframe Number.

33. The system of claim 24 wherein the DMRS estimator component is configured to determine a DMRS for the received interfering signal by determining one or more likely Cell IDs based on a relationship between the first cell and other cells of the LTE communication system.

34. The system of claim 24 wherein the DMRS estimator component is configured to determine a DMRS for the received interfering signal by determining one or more likely Subframe Numbers based on a relationship between the first cell and other cells of the LTE communication system.

35. The system of claim 24 wherein the DMRS estimator component is configured to determine a DMRS for the received interfering signal by determining the transmit parameter based on information shared between base stations.

36. The system of claim 24 wherein the DMRS estimator component is configured to determine a DMRS for the received interfering signal by determining, for a given transmit parameter, a subset of all possible values permitted for an LTE communication system, the subset being determined based on a rule employed by the network operator.

37. The system of claim 36 wherein the rule employed by the network operator includes at least one of a restriction on a number of allowable Base Sequences, a restriction on a time progression of Base Sequences, a restriction on a number of total allowable cyclic shifts ($\alpha$), and a restriction on a number of allowable Bandwidth Allocations.

38. The system of claim 24 wherein the DMRS estimator component is configured to determine the DMRS based on the at least one transmit parameter includes determining a cyclic shift ($\alpha$) by:

correlating a Base Sequence with a known cyclic shift ($\alpha$);

determining a time offset from the known cyclic shift ($\alpha$); and determining the cyclic shift ($\alpha$) based on the determined time offset.

39. The system of claim 24 wherein the DMRS estimator component is configured to determine a DMRS for the received interfering signal by determining a structure of a correlation between a reference sequence and the received interfering signal, wherein the determined structure is at least one of a width of a correlation peak time, a width of a correlation peak frequency, structure across adjacent resources blocks, and a location of multiple correlation peaks.

40. The system of claim 24 wherein the DMRS estimator component is configured to determine a DMRS for the received interfering signal by determining the DMRS based on information shared between base stations regarding a Base Sequence and a cyclic shift ($\alpha$).

41. The system of claim 40 wherein the information shared is at least one of a number of users requesting scheduling grants, earlier allocations of a base sequence, earlier allocations of a cyclic shift, a cell ID, and partial scheduling information.

42. The system of claim 24 wherein the DMRS estimator component is configured to determine a DMRS for the received interfering signal by:

determining a set of potential DMRSs based on the detected at least one transmit parameter; and determining the DMRS by comparing at least one of the potential DMRSs to the received interfering signal.

43. The system of claim 24 further comprising determining, based on the determined DMRS, a channel estimate for the mobile device transmitting the received interfering signal.

44. The system of claim 24 further comprising determining, based on the determined DMRS, an identity for the mobile device transmitting the received interfering signal.

45. The system of claim 24, wherein the DMRS estimator component is configured to:
  determine a DMRS associated with at least one mobile device being served by the first cell; and
  remove the determined DMRS associated with at least one mobile device being served by the first cell from being considered.

46. A non-transitory computer readable medium storing a computer program, executable by a machine, for determining a DMRS for an intercell interfering signal received from a mobile device in a LTE communication system, the computer program comprising executable instructions for:
  receiving, at a receiver serving a first cell in an LTE communication system, an interfering signal transmitted from a mobile device being served by a second cell of the LTE communication system, the interfering signal received wirelessly as intercell interference; and
  detecting at least one transmit parameter from the wirelessly received interfering signal;
  determining, based on the detected transmit parameter, a DMRS for the received interfering signal without prior explicit knowledge of the DMRS.

* * * * *